Feb. 2, 1937. H. W. BARTHOLOMEW 2,069,299
MILLING MACHINE
Filed May 27, 1935 4 Sheets-Sheet 1

Inventor
Howard W. Bartholomew
Owen & Owen
By
Attorneys

Feb. 2, 1937.  H. W. BARTHOLOMEW  2,069,299
MILLING MACHINE
Filed May 27, 1935   4 Sheets-Sheet 2

Inventor
Howard W. Bartholomew
Owen & Owen
By
Attorneys

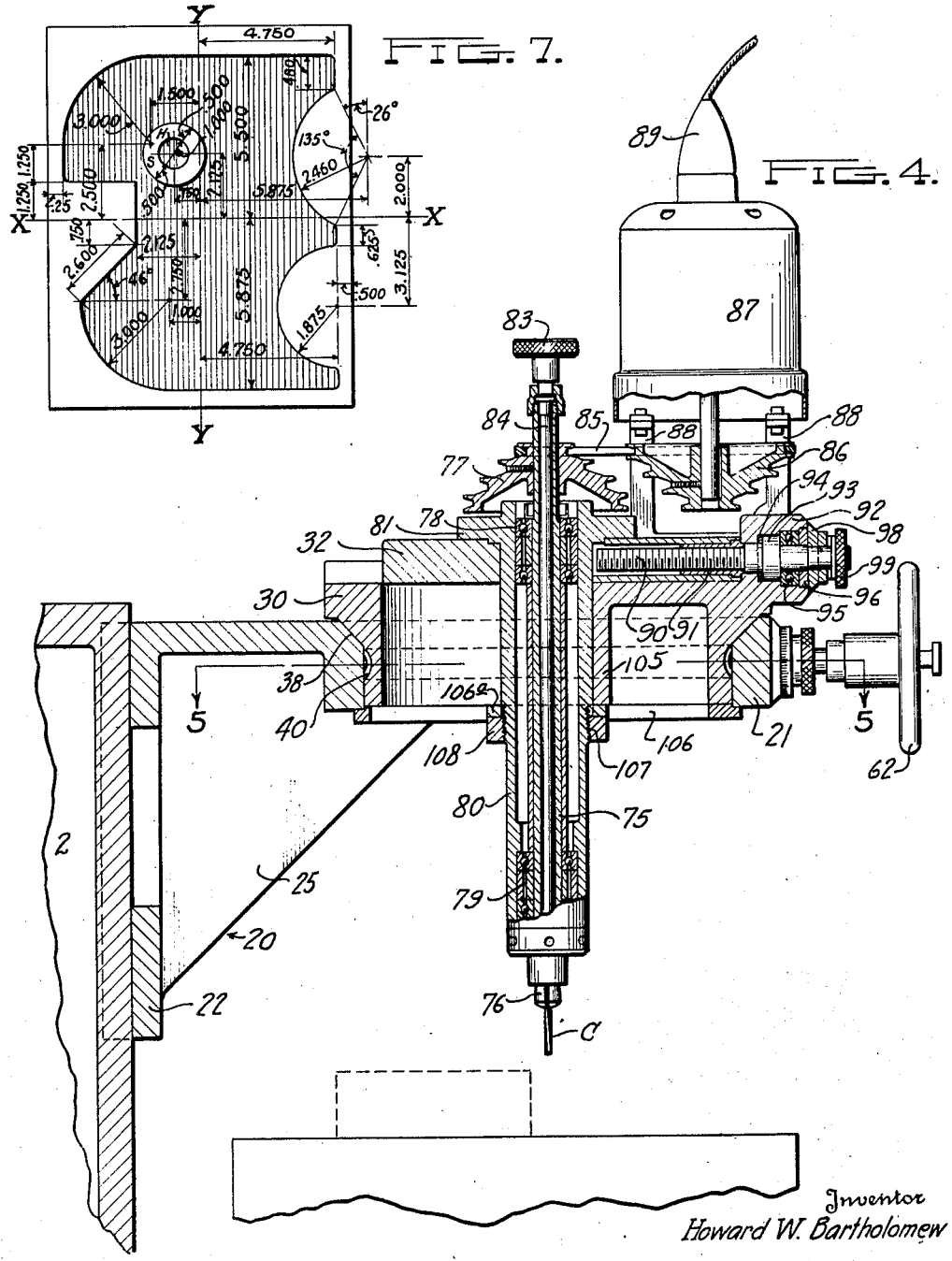

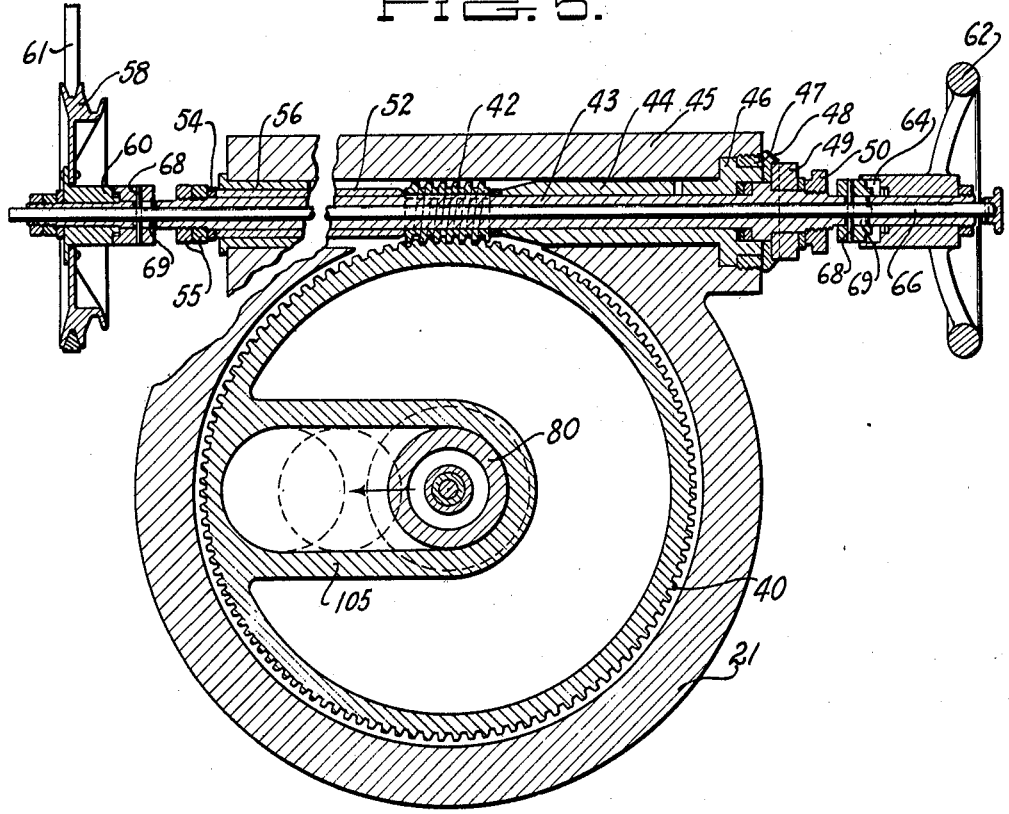

Patented Feb. 2, 1937

2,069,299

UNITED STATES PATENT OFFICE 2,069,299

MILLING MACHINE

Howard W. Bartholomew, Pottstown, Pa., assignor to Doehler Die Casting Company, Toledo, Ohio, a corporation of New York Application May 27, 1935, Serial No. 23,562

REISSUED

6 Claims. (Cl. 90—15)

This invention relates to milling and boring machines, and is more particularly directed to a universal attachment for such a machine.

It has heretofore been proposed to provide attachments for vertical spindle milling machines, which reduce the number of set-up operations required in the formation of a die block. Such attachments have taken the form of a circular table for the machine having cross feeds built therein below the die holding surface so that the work may be moved to a designated center and then swung about this center to cut on an arc. In every instance these devices have been so constructed as to require rotation of the work for such a cut, and thus are attended by the disadvantage that the throat of the machine must be unusually deep to accommodate work of any great size.

It has also been proposed to provide a vertical spindle which is carried by cross slides in such a manner as to be movable to a given center above the work. Such a device is of limited utility, even when used with a circular table, as it is impossible to cut on an arc having a center other than that of the circular table on which the work is carried.

The present invention has for its primary object the provision of means to move a vertical spindle of a milling machine in a circular path of any designated radius.

Another object of the invention is the provision of means which will enable the operator of the machine to cut any desired shape, so long as he is given the radius of all circular cuts and the coordinates of the centers, without removing the work for resetting.

Another object of the invention is the provision of a device of this character, which is sturdy in its construction, simple and efficient of operation and which may be either built into a milling machine or made an attachment to an existing machine at a relatively low cost.

Other objects and advantages of the invention will become apparent as the description proceeds, reference being had to the accompanying drawings, in which—

Figure 1:
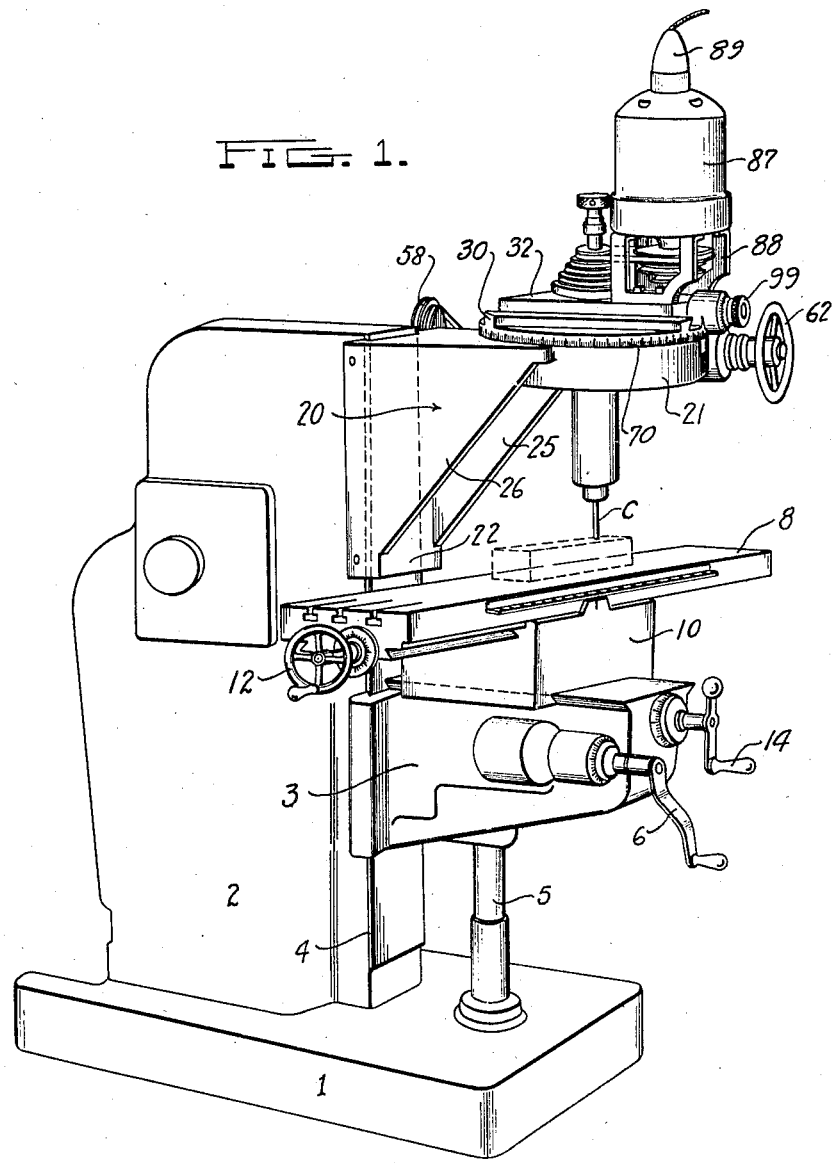
Figure 2:
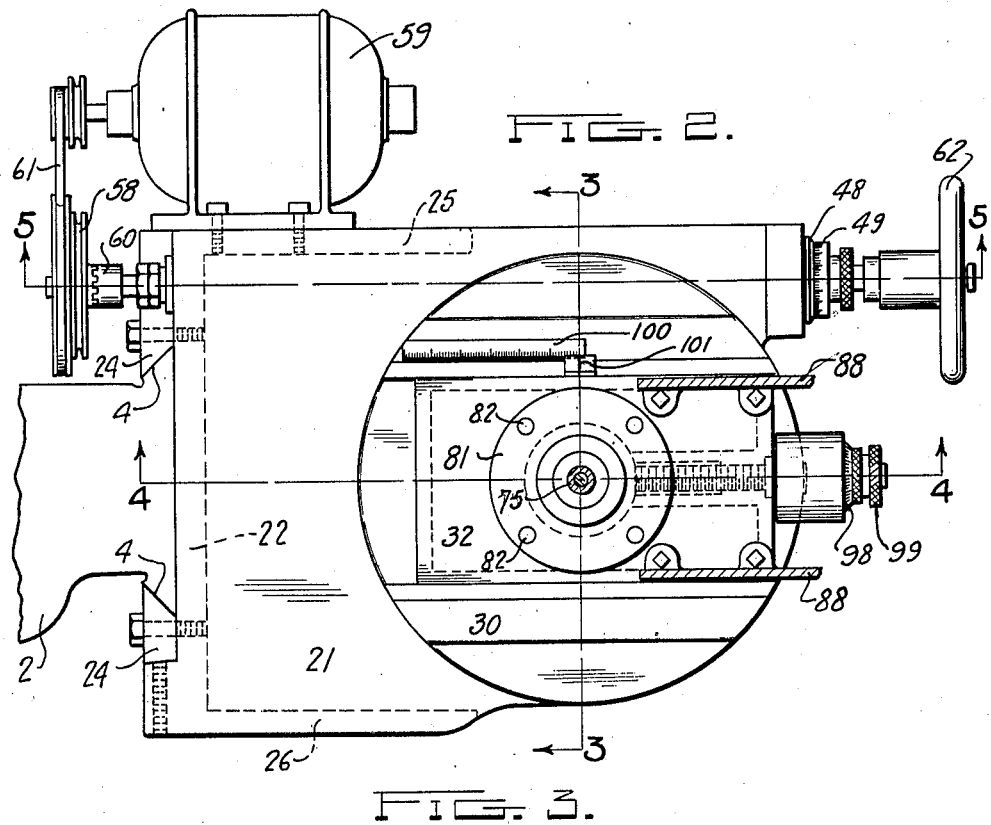
Figure 3:
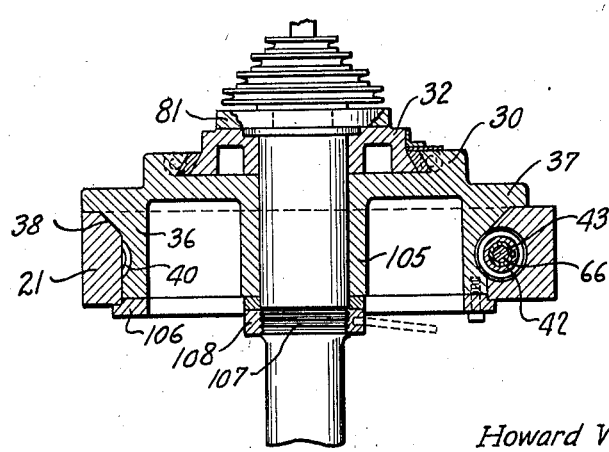

Figure 1 is a diagrammatic perspective view of a milling machine equipped with an attachment constructed in accordance with the present invention; Fig. 2 is a fragmentary plan view, with parts in section, taken on a plane immediately overlying the body of the attachment; Fig. 3 is a fragmentary section on line 3—3 of Fig. 2 with parts in full; Fig. 4 is a central vertical section of the attachment taken on line 4—4 of Fig. 2; Fig. 5 is a section on line 5—5 of Fig. 4, with parts broken away; Fig. 6 is a fragmentary front elevation of the attachment, and Fig. 7 is a plan view of an arbitrary sample of work cut by the machine.

In the embodiment shown, the invention is carried as an attachment to a milling machine having a base 1 and an upright frame part 2. A knee 3 is vertically adjustable on the frame, being guided in undercut grooves 4 and moved by a vertically telescoping post support 5. The vertical adjustment is made by a hand crank 6 in the usual manner.

A work table 8 is mounted for longitudinal sliding movements transversely of the frame on a saddle 10, the movement being effected by a longitudinal-feed screw controlled by a hand-wheel 12. The saddle 10 is, in turn, mounted for cross movements, that is, inward and outward movements, relative to the knee 3, the cross feed being controlled by a hand crank 14. It will thus be seen that the table 8 on which the work is carried is movable in rectilinear paths by the longitudinal feed 12 and the cross feed 14. Vertical movements of the table are made by the vertical feed 6. It will be appreciated that all of these feeds may be mechanized by connecting them to a motor carried within the frame 2 in any suitable manner, as well understood in the art. The extent of movement, or position of each of the feeds, is determinable at any time by vernier scales previously fixed to the machine and properly calibrated. These scales form a part of all conventional feeds, and are, therefore, not shown. It will be understood that the parts so far described are well known and constitute equipment generally associated with machines of this kind.

The spindle controlling attachment to which the present invention is particularly directed is carried by the upright machine frame 2, in the present instance by an inverted L-shaped supporting frame 20 having a forwardly extending horizontal portion 21 and a vertical leg 22. Adjustable clamping gibs 24 are carried on each side of the vertical leg 22 and are adapted to engage in the under-cut grooves 4 to hold the attachment in adjusted position relative to the frame 2. Bracing webs 25 and 26 connect the horizontal and vertical frame parts to supply rigidity to the construction. It will be appreciated that any suitable frame may be provided to hold the attachment in a constant horizontal plane above the work, and that, in the present instance, such position may be readily changed by adjusting the clamping gibs 24.

The milling attachment itself comprises a rotatable head 30, mounted for rotation in the frame 20, and having a cross slide 32 mounted therein and a cutter spindle carried by said slide. The details of construction, drive and relationship of the parts will be presently described.

As shown in Fig. 3, the rotatable head 30 is constructed to include a vertical part 36 received in a forwardly disposed circular opening in the horizontal frame part 21. An outwardly extending flange 37 is provided on the periphery of the head 30 and is adapted to overlie the upper surface of the frame, and is connected with the vertical part 36 by an annular bearing surface 38 cooperating with a similar surface formed in the frame 21.

Gear teeth 40 are cut in the periphery of the vertical part 36 of the head 30, so that the head may be turned relative to the frame 21. As shown in Fig. 5, rotation of the head is effected either manually or by a motor drive through the medium of a worm 42 keyed, or otherwise fixed, to a drive shaft 43 journaled at the forward end in a sleeve 44, which is received in the bore of a hollow frame extension 45. The sleeve 44 is shouldered adjacent its outer end, as at 46, and cooperates with an enlargement of the bore to prevent axial displacement of the worm 42 in a forward direction. An annular following ring 47 clamps the shoulder 46 against the frame extension. A vernier mechanism is fixed to the part of the drive shaft which extends beyond the outer end of the frame extension 45 and includes a stationary plate 48 fixed to the end of the sleeve 44, so as to be held against rotation. A circular scale 49 is suitably graduated and rotates with the drive shaft 43, being held thereon by a lock-nut and washer assembly 50.

At its rear end the drive shaft 43 is received in a sleeve 52. This sleeve abuts against the worm 42 at its inner end and at its outer end is engaged by a washer ring 54. Lock nuts 55 are threaded onto the drive shaft and force the washer 54 against the sleeve, and hence urge the latter against the worm 42 to take up any axial play which may be developed in the gear. The sleeve 52, which may turn with the shaft 43, is journaled in a suitable bushing 56 mounted in the rear end of the bore of the frame extension 45.

The drive shaft 43 extends rearwardly of the frame and carries a drive pulley 58, the hub of which is enlarged to form part of a jaw clutch 60. A driving motor 59 is fixed to the bracing web 25 and is connected by an endless belt 61 to the pulley 58 so as to rotate the shaft 43 through the latter whenever the jaw clutch 60 is engaged. A hand wheel 62 is carried by the shaft 43 at its forward end and has its hub internally grooved to form part of a jaw clutch 64. The drive shaft 43 is made hollow throughout its length and receives a shift rod 66. The moving parts of both the jaw clutches 60 and 64 are fixed to the shift rod 66 by pins 68 which extend through suitable slots 69 in the drive shaft so as to provide for limited axial sliding movements of the clutch parts relative to the drive shaft.

It will be seen that when the rod 66 is pushed inwardly, to the position shown in Fig. 5, the parts of the jaw clutch 60 are engaged so that the drive shaft 43 is driven through the pulley 58 by the motor 59. When the shift rod 66 is pulled outwardly, the clutch 60 becomes disengaged and the parts of the clutch 64 are moved into engagement, so that the rotation of the drive shaft is now accomplished through the medium of the hand wheel 62, the parts being positively connected by the cooperating members of the jaw clutch.

A scale 70 divided to read in degrees is provided around the exposed side of the flange 37 of the head 30. The divisions of the vernier scale 49 are in minutes and seconds so that it is possible to ascertain the exact angular position of the head at any time. A reference mark 71 is carried by the frame 21 to cooperate with the scale.

As shown in Fig. 4, the cutter assembly is supported by the rotatable head 30 through the medium of a cross slide 32 gibbed into the head so as to be movable diametrically thereof in a manner hereafter described. The cutter assembly embodies a vertical rotary cutter spindle 75, having provision at its lower end to receive conventional chuck parts 76 by which a suitable milling tool C may be releasably held. The cutter spindle 75 extends above the plane of the cross slide 32 and is there provided with a stepped drive pulley 77. Suitably spaced anti-friction bearings 78 and 79 support the spindle at points adjacent its upper and lower ends, the entire assembly being retained in a vertical spindle housing 80. The housing 80 is enlarged at its upper end in a flange 81 by which it is fixed to the cross slide 32 by screws 82. A hand wheel 83 is provided at the upper end of a threaded rod 84 which extends longitudinally through the cutter 75 to open or close the jaws of the chuck 76 in the lower end of the spindle to engage or release the shank of the milling tool C. While the rod 84 normally rotates with the spindle, it can be turned relative thereto to impart releasing or clamping movements to the chuck parts.

The cutter spindle 75 is driven by an endless belt 85 which engages the drive pulley 77 and extends therefrom to be trained over a pulley 86 fixed to the shaft of a suitable driving motor 87 carried by brackets 88 on the cross slide 32. The pulley 86 is stepped in a manner similar to the pulley 77 so that variations in the rotating speed of the cutter spindle are obtainable from a constant speed motor by shifting the drive belt 85. Obviously, the drive from the motor to the spindle may be accomplished in various ways.

Current may be supplied to the spindle driving motor 87 by any suitable means, such as a conventional brush and slip ring device 89.

The cross slide 32, and the parts carried thereby, namely the cutter assembly and drive, are movable diametrically of the rotatable head 30. As shown in Figs. 2 and 4, the mechanism used to impart movements to the slide includes a micrometer screw 90 working in a threaded tubular member 91 fixed in the cross slide at one end thereof. The screw 90 extends through a vertical extension 92 of the head 30 so that the reaction incident to movement of the cross slide by the screw is taken by the head. A shoulder 93 is formed on the screw and is held between a washer 94 on its inner side and an anti-friction thrust bearing 95 on its outer side. The washer is inserted between the shoulder and a cooperating head part while the thrust bearing 95 is brought snugly into position by an annular threaded follower ring 96 threaded into the bore of the head part. Thus, when the screw 90 is working to move the cross slide out from the center, the thrust is taken by the bearing 95 and the annular ring 96, while on a return of the slide, the force is transmitted through the washer 94 to the rotatable head.

A properly calibrated vernier scale 98 is fixed to the screw 90 and is adapted to be read in conjunction with a reference mark impressed on the adjacent frame surface. A hand knob 99 is also fixed to the shaft to be grasped by the operator.

A "coarse" scale 100 (Fig. 2) is fixed to the rotating head adjacent the cross slide 32 and parallel to the gibbing by which the latter is guided. A reference mark 101 is carried on the slide. This scale is preferably graduated in tenths of an inch, while the vernier scale 98 is graduated in thousandths. It will thus be seen that the movement of the cross-slide relative to the rotating head may be accurately determined. When the reading of both scales 98 and 100 is zero, the axis of the cutter spindle, and hence the milling tool, exactly coincides with the center of rotation of the rotating head 30. Any movement of the slide, therefore, causes an eccentricity of the two centers, so that the center of the milling tool revolves about the central axis of the rotating head on a circular path, the radius of which is read on the scales 100 and 98, when the head 30 is rotated by the worm 42. This operation will be hereafter more fully explained.

As shown in Figs. 4 and 5, the head 30 is provided with a vertical, radially disposed guideway 105 in which the spindle housing 80 of the cutter assembly reciprocates. A ring 106 is secured to the under side of the rotatable head extension 36 and underlies the adjacent edge of the frame 21 to retain the head in position therein.

The spindle housing 80 is externally threaded, as at 107, at points where the housing emerges from the guideway 105. A clamping nut 108 is threaded onto the housing and is adapted to be forced against a washer 106a and the guideway 105 so as to support the housing and spindle assembly against vibration. When it is desired to move the tool to a new cutting position, the nut 108 is backed off, out of engagement with the plate. After the proper setting has been reached, the nut is again clamped to support the cutter assembly. It will thus be seen that the cutter spindle and its housing are held at two spaced points, by the clamping nut 108 and flange 81 by which the housing is fixed to the cross slide 32.

For purposes of illustration, the operation of the present invention will be described with reference to an arbitrary sample of work shown in Fig. 7. It will be assumed that it is desired to mill out the shaded area shown to a predetermined depth, leaving only the outline and an annular surface S surrounding a hole H cut entirely through the block. The block is first clamped to the table with the center lines X—X and Y—Y squared with the directions of movement of the cross feed and longitudinal feed with which the machine is regularly equipped. The intersection of the X axis, represented by the longitudinal feed, and the Y axis, represented by the cross feed, is then brought directly under the center of the cutter C, the latter having been previously made concentric with the rotating head 30, so that the readings of the scale 100 and its vernier 98 are at 0. With the parts in this position, the indications on the scales associated with the respective cross and longitudinal feeds are taken and noted. In most instances, the scale of the longitudinal feed is graduated to increase from left to right and moves with the table 8 of the machine while the reference mark with which the scale is read is stationary. For the sake of simplicity, it is assumed that the longitudinal feed scale and its vernier reads 8.000 and the cross feed scale and vernier reads 7.000. Assume also that the diameter of the cutter C is .250 inch.

If the work is to start in the lower right hand corner of the block, the block is moved to the left with relation to the cutter a distance on the X axis such that the outer edge of the cutter will be 4.750 inches from its original position, being the outer dimension given for this point. Thus, it is necessary to move the work under the center of the cutter 4.625 inches, or until the scale reading is 12.625. The cross feed is then actuated to move the block in toward the throat of the machine a distance 5.750 inches, the dimension given, minus one-half the diameter of the cutter, so that the cross feed scale reads 12.625. The cutter spindle is then started by starting the driving motor 87. By moving the block up against the cutter by actuation of the vertical feed hand crank 6, the cutting is begun and the vertical feed is continued until the desired depth of the cut has been reached as indicated on the vernier associated with the vertical feed.

It will be seen that the first part of the cut is to be made parallel to the X axis and is to continue until a tangent with the circle in the lower left hand corner is reached. Thus, it is necessary to feed the work under the cutter, moving it to the right, until the center of the cutter is on a line with the given center of the circle. This latter center is given one inch to the left of the Y axis, so that the cut should continue one inch beyond this axis, making the total straight line cut 5.625 inches. This cut may be made by rotating the longitudinal-feed hand-wheel 12. At this point the advantage of the present invention becomes particularly apparent.

The arbitrary work shown calls for a circular cut 90° in extent on a three inch radius. It will be seen that it is desired to mill out all material on the inside of the radius so that the outside of the cutter must lie on a point three inches from the given center. In order to make this cut, the first operation is to lower the work from contact with the cutter, and by moving the cross and longitudinal feeds, center the work on a point 2.750 inches down on the Y axis and 1.000 inch to the left on the X axis being the dimensions given. Since the coordinates of the reference center of the block are 8.000 and 7.000 respectively, the scale readings will be 9.750 on the cross feed and 7.000 on the longitudinal feed. Having thus located the center, the cutter is moved so that it will cut on a three inch radius. This movement is accomplished by turning the screw 90 by means of the hand knob 99 to move the cross slide 32 out from the center of the rotating head until the desired radius is indicated on the scale 100 and its associated vernier 98. As above noted, it is desired to mill out the material on the inside of this circle so that the reading on the scale 100 will be the given radius, minus one-half the diameter of the cutter (.125 inch) or 2.875 inches. When this has been done, the center of the cutter will overlie a point somewhat to the rear of the X axis in Fig. 7, but by turning the rotating head 30 through 180°, as indicated on the scale 70, the cutter will again overlie the part which has just been removed by the straight cut. The spindle 80 is then clamped against the plate 106 by the ring 108. The vertical feed is then used to move the work up to the cutter and the cutter driving motor 87 is again started. The work is permitted to remain stationary and the rotating head 30 is turned through an arc of 90° in a clockwise direction. Since the starting point was indicated by 180° on the scale 70, the rotation will continue until the scale reading is 270° on the same scale. With the cutter in this position, the three inch circle will have been completed.

As soon as the 90° circular cut has been completed, the layout given in Fig. 7 calls for a cut made on an angle of 46° with the X axis. To make this cut the work is lowered from the spindle which is released from its clamped position and retracted to the center of the head, a distance of 2.875 inches, and the table is moved a like distance to follow it. The rotating head is then swung around until the cross slide 32 lies on an angle of 46° from the X axis, which will be indicated by a reading of 46° on the scale 70. With the parts in this position the spindle may be again lowered into engagement with the work and its rotation started. The cut will be made by rotating the cross slide feed screw 90, which serves to push the cross slide, and consequently the spindle, along a line disposed at an angle of 46°, as called for in the diagram. This cut may be continued well beyond the dimension given of 2.600 inches, inasmuch as the cutter will be working in an area which is to be entirely milled out. However, it is preferable to continue the cut only until the rear edge of the cutter has reached the dimension, which will be indicated on the scale 100 and its vernier 98 by a reading of 2.725, being the straight line dimension plus one-half the diameter of the cutter.

If the operator next wishes to cut the hole H and leave the annular surface S, this may be done by lowering the work out of engagement with the tool, and moving it until the given center lies directly under the center of the rotating head 30. Thus, the scale on the longitudinal feed will read 7.250 (being the initial reading minus the X dimension) and the scale in the cross feed will read 5.875 (the initial reading minus the Y dimension). To cut the hole H, the operator will set the cross slide 32 to the radius of the hole minus one-half the diameter of the cutter. Since the hole has a one-half inch radius, the reading on the scale 100 and its vernier will be .375. The work is then brought into contact with the cutter which has been started, and the rotating head 30 is also started by starting its driving motor 59, and engaging the jaw clutch 60 by moving the shift rod 66. Thus, the head is now being rotated by the driving motor 59, and the spindle is being rotated by its driving motor 87. The spindle, however, is now revolving about the center of the rotating head with the outside of the cutter following a point one-half inch removed from this center. This motion is continued, while the operator moves the vertical feed as the cut progresses until the hole is completely bored through the block, as called for in the layout. It will thus be seen that the present invention enables the operator to cut a hole of any given diameter up to the capacity of the machine without changing the size of the cutter used, and without regard to the location of the center of the hole.

After the hole has been completed, the table is in position to cut around the annular surface S. The work is then lowered away from the cutter which is adjusted to cut on the outside of a circle having a one inch radius, being the radius of the hole plus the radial dimension given for the annular surface S. It will thus be necessary to move the center of the cutter to a point one inch from the center of the rotating head plus one-half the diameter of the cutter, or 1.125 inches, as indicated on the scale 100 and its associated vernier. The work is then again brought into contact with the cutter and both the cutter driving motor 87 and the head driving motor 59 are started, so as to rotate the cutter and at the same time rotate the head 30. It will be seen that the cutter is again describing a circle about the center of the rotating head, the radius of the circle being indicated on the scale 100. This cut is continued until the block has been milled to the desired depth, the operator feeding the work against the cutter by actuation of the vertical feed.

The next cut to be made is the three inch corner radius in the upper left hand corner of the layout. Again the operator moves the work with relation to the center of the rotating head so that the indication on the longitudinal feed scale is 6.500 (the initial reading minus the X dimension given), and the reading on the cross feed scale is 4.500. The spindle is again set for an inside cut on a three inch radius, so that the reading on the scale 100 is the radial dimension of the cut minus one-half the diameter of the cutter, or 2.875 inches. It will be seen from the diagram that the cut is to extend 90° so that after the spindle has been moved and clamped in the proper radial position, the rotating head 30 may be moved by the handwheel until the angular reading on the scale 70 indicates 0°. At this point, the cutter will be in a position to operate on the farthest extremity of the radius, so that it will be swung in a counterclockwise direction on the layout to make the desired cut. The operator may then start the spindle and, by moving the vertical feed, cut to the desired depth. The circular cut will best be made by moving the head 30 by means of the hand-wheel 62, so that the shift rod 66 will be pulled out to disengage the clutch 60 and engage the clutch 64. By turning the hand-wheel 62 so that it will rotate the head 30 in a counterclockwise direction, the cut will be continued until the reading of the scale 70 and its associated vernier is 270°. The rotation of the head 30 may now be stopped since the circular cut is finished, but the rotation of the cutter will be continued since the next cut is a straight line tangent to the corner circle and 1.250 inches in extent. The cross feed is then rotated to move the block under the cutter in towards the throat of the machine a distance of 1.125 inches (the dimension minus one-half the diameter of the cutter), or until the reading of the cross feed scale is 5.625. It should be here noted that the straight line cut will be exactly tangent to the circular corner cut.

The square cornered cut indicated in the center left hand part of the diaphragm is made by rotating the longitudinal feed so as to move the block under the cutter to the left until the back of the cutter reaches the indicated dimensional distance of 2.125 inches on the X axis. The longitudinal feed scale will now read 6.000, being the dimension given for the end of the line plus one-half the diameter of the cutter. By moving the cross feed to force the block under the cutter towards the throat of the machine, the vertical straight line indicated on the layout may be cut and will be continued until the line has intersected with the 46° line previously cut.

It will be noted that the cutter is still clamped in the position which was used to cut the three inch radius in the upper left hand corner, so that the operator will return the block to the point at which this radius was cut and by moving the rotating head until the scale 70 indicates 0° will be in a position to make the straight line cut across the top of the block. This cut is made in the usual manner by moving the longitudinal feed to move the block under the cutter. When the block has been moved a distance indicated by the dimension minus one-half the diameter of the cutter, the latter will be at the extreme upper right of the block and the longitudinal feed scale will read 12.625. At this time the straight line portion of the right hand side of the block may be cut by moving the block under the cutter a distance of 1.480 inches minus the full diameter of the cutter since the dimensions of the cut are the extremities of the effectual travel of the tool. The cross feed scale will now indicate 2.855 and the parts are in position to make the circular cut indicated at the top right of the diagram. It will be noted that the center of this cut lies two inches above the X axis and 5.875 inches to the right of the Y axis, bringing it outside of the block. It will also be noted that this cut is 135° in extent. The operator moves the longitudinal and cross feeds until the indicated center lies directly under the center of the rotating head 30. The longitudinal feed scale will read 13.875, the initial reading plus the given dimension, and the cross feed scale will read 5.000, the initial reading minus the given dimension. The clamp 108 is backed off and the cross slide 32 moved until the scale 100 and its associated vernier 98 indicate that the center of the cutter lies out from the center of the rotating head 30, the radial distance plus one-half the diameter of the cutter or 2.585 inches. The cut is to be started at an angle of 26° in a counterclockwise direction from the Y axis, so that the reading on the scale 100 at the beginning of the cut will be 26°. The cut is then continued in a counterclockwise direction 135° so that the indication on the scale 70 is 161°. With the housing 80 still clamped in the same position the small vertical cut of .625 inch may be made by moving the cross feed the dimensional distance minus the diameter of the cutter or .475 inch.

The last circular cut is made by moving the cross slides until the indicated center lies under the center of the rotating head 30. The dimensions of the center are 4.750 inches on the axis and 3.125 inches on the Y axis, so that the longitudinal feed scale reads 12.750 and the cross feed scale reads 10.125. The cross slide 32 and the spindle housing are moved until the cutter occupies the proper position with relation to the head 30, so that its center is removed from the center of the rotating head the radial distance plus one-half the diameter of the cutter or 2.000 inches as indicated on the scale 100 and its associated vernier. The cut is to be started at a point which will be indicated at 0° on the scale 70 since this point is directly above the given center, and is to be continued 180°. With the scale 70 at 0° and the parts clamped in the proper position, rotation of the head 30 may be started and continued in a counterclockwise direction until the scale 70 and its vernier 49 indicates 180°. This completes the circular cut, and the outline of the block is then completed by moving the cross feed so as to move the block in towards the throat of the machine under the cutter until the last straight line cut intersects the initial cut.

To summarize the operation, all straight line cuts parallel to either of the given axes are made by moving the cross and longitudinal feeds with which the machine is regularly equipped. All circular cuts are made by moving the cross and longitudinal feeds until the indicated center lies directly under the center of the rotating head 30. With the parts in this position, the cross slide 32 is moved out from the center of the rotating head 30 the radial distance indicated on the layout, plus or minus one-half the diameter of the cutter depending on whether an inside or outside cut is to be made. Thus, when the head is rotated, the cutter will revolve about the indicated center of the cut on the designated radius. Angular cuts may be made by feeding the cross slide relative to the head 30 without moving the latter except to position the parts to start the cut.

Obviously, numerous modifications and changes may be made in the mechanisms comprising the cutter spindle and its associated parts, and various changes may be made in the devices used to accomplish the several movements. It should be expressly understood that the present invention comprehends such modifications and changes as may fall within the scope of the appended claims.

Having thus described my invention, what I claim as new, and desire to secure by United States Letters Patent, is:

1. In a milling machine, a frame, a vertically adjustable work table carried thereby, means to move the table laterally in different directions with respect to the frame, a cutter spindle, rotatable supporting means for the spindle, means to mount the rotatable supporting means on the frame in operative relation to the table, means to actuate the spindle supporting means, means to move the cutter spindle radially of the supporting means to effect varying cutting positions thereof relative to the work supporting table and releasable means carried by the spindle intermediate its ends and engaging a portion of the rotatable supporting means to retain the spindle in its radially adjusted position relative to the supporting means.

2. In a milling machine, a frame, a vertically adjustable work table carried thereby, means to move the table laterally in different directions with respect to the frame, a cutter spindle, rotatable supporting means for the spindle, means to mount the rotatable supporting means on the frame in operative relation to the table, means to move the cutter spindle radially of the supporting means independently of the latter to effect varying cutting positions of the spindle relative to the work supporting table, and means to actuate the spindle supporting means, whereby to move the cutter spindle in a path circumferentially of the axis of the work carried by said work table.

3. In a milling machine, a frame, a vertically adjustable work table carried thereby, means to move the table laterally in different directions with respect to the frame, a cutter spindle, rotatable supporting means for the spindle having a radially extending trackway in which said spindle is adapted to move, means carried by the spindle and engageable with said trackway to retain the spindle in varying cutting positions, means to mount said rotatable supporting means on the frame in operative relation to the table, and means to actuate the rotatable spindle supporting means, whereby to move the cutter spindle in a path circumferentially of the axis of the work carried by said work table.

4. In a milling machine, a frame, a vertically adjustable work table carried thereby, means to move the table laterally in different directions with respect to the frame, a cutter spindle, vertically adjustable rotatable means to support the cutter spindle from the frame in operative relation to the table, means to move the cutter spindle radially of the supporting means, and means to rotate the supporting means, whereby to move the cutter spindle in a path circumferentially of the axis of the work carried by said work table.

5. In a milling machine, a frame, a vertically adjustable work table carried thereby, means to move the table laterally in different directions with respect to the frame, a cutter spindle, vertically adjustable rotatable supporting means for the spindle, means to mount the rotatable means on the frame in operative relation to the table, means to move the cutter spindle radially of the supporting means independently of the latter to effect varying cutting positions of the spindle relative to the work supporting table, and means to actuate the spindle supporting means whereby to move the cutter spindle in a path circumferentially of the axis of the work carried by the work table.

6. In a milling machine, a frame, a vertically adjustable work table carried thereby, means to move the table laterally in different directions with respect to the frame, a cutter spindle support movably mounted on the frame, a cutter spindle, means for slidably mounting the spindle upon said support for lateral adjustment with respect thereto, and means for rotating said spindle support whereby to move the cutter spindle in a path circumferentially of the axis of the work carried by said work table.

HOWARD W. BARTHOLOMEW.